(12) United States Patent
Andreopoulos et al.

(10) Patent No.: US 11,223,833 B2
(45) Date of Patent: Jan. 11, 2022

(54) PREPROCESSING IMAGE DATA

(71) Applicant: iSize Limited, London (GB)

(72) Inventors: Ioannis Andreopoulos, London (GB); Aaron Chadha, London (GB)

(73) Assignee: iSize Limited, London (GB)

( * ) Notice: Subject to any disclaimer, the term of this patent is extended or adjusted under 35 U.S.C. 154(b) by 0 days.

(21) Appl. No.: 17/039,605

(22) Filed: Sep. 30, 2020

(65) Prior Publication Data

US 2021/0211682 A1 Jul. 8, 2021

Related U.S. Application Data

(60) Provisional application No. 62/957,286, filed on Jan. 5, 2020, provisional application No. 62/962,971, filed
(Continued)

(51) Int. Cl.
*H04N 7/12* (2006.01)
*H04N 19/176* (2014.01)
(Continued)

(52) U.S. Cl.
CPC ........... *H04N 19/176* (2014.11); *H04N 19/12* (2014.11); *H04N 19/124* (2014.11); *H04N 19/126* (2014.11); *H04N 19/136* (2014.11); *H04N 19/147* (2014.11); *H04N 19/154* (2014.11); *H04N 19/172* (2014.11); *H04N 19/182* (2014.11); *H04N 19/184* (2014.11);
(Continued)

(58) Field of Classification Search
CPC .. H04N 19/154; H04N 19/124; H04N 19/172; H04N 19/61

USPC .................................................... 375/240.16
See application file for complete search history.

(56) References Cited

U.S. PATENT DOCUMENTS

2009/0304071 A1 12/2009 Shi et al.
2010/0119156 A1 5/2010 Noguchi et al.
(Continued)

FOREIGN PATENT DOCUMENTS

CN 110248190 A 9/2019
EP 1605362 A1 12/2005
(Continued)

OTHER PUBLICATIONS

Dong et al., "Adaptive downsampling for high-definition video coding." IEEE Transactions on Circuits and Systems for Video Technology 24.3 (2014): 480-488.
(Continued)

*Primary Examiner* — Gims S Philippe
(74) *Attorney, Agent, or Firm* — Patterson + Sheridan LLP

(57) ABSTRACT

A method of preprocessing, prior to encoding with an external encoder, image data using a preprocessing network comprising a set of inter-connected learnable weights is provided. At the preprocessing network, image data from one or more images is received. The image data is processed using the preprocessing network to generate an output pixel representation for encoding with the external encoder. The preprocessing network is configured to take as an input encoder configuration data representing one or more configuration settings of the external encoder. The weights of the preprocessing network are dependent upon the one or more configuration settings of the external encoder.

20 Claims, 9 Drawing Sheets

Related U.S. Application Data on Jan. 18, 2020, provisional application No. 62/962,970, filed on Jan. 18, 2020, provisional application No. 62/971,994, filed on Feb. 9, 2020, provisional application No. 63/012,339, filed on Apr. 20, 2020, provisional application No. 63/023,883, filed on May 13, 2020.

(51) Int. Cl.
| | |
|---|---|
| H04N 19/147 | (2014.01) |
| H04N 19/172 | (2014.01) |
| H04N 19/61 | (2014.01) |
| H04N 19/12 | (2014.01) |
| H04N 19/136 | (2014.01) |
| H04N 19/182 | (2014.01) |
| H04N 19/184 | (2014.01) |
| H04N 19/44 | (2014.01) |
| H04N 19/85 | (2014.01) |
| H04N 19/126 | (2014.01) |
| H04N 19/65 | (2014.01) |
| H04N 19/86 | (2014.01) |
| H04N 21/2662 | (2011.01) |
| H04N 19/124 | (2014.01) |
| H04N 19/154 | (2014.01) |

(52) U.S. Cl.
CPC ............. *H04N 19/44* (2014.11); *H04N 19/61* (2014.11); *H04N 19/65* (2014.11); *H04N 19/85* (2014.11); *H04N 19/86* (2014.11); *H04N 21/2662* (2013.01)

(56) References Cited

U.S. PATENT DOCUMENTS

| | | | |
|---|---|---|---|
| 2012/0033040 A1 | 2/2012 | Pahalawatta et al. | |
| 2015/0042878 A1 | 2/2015 | Jeon et al. | |
| 2017/0193335 A1* | 7/2017 | Montoro | G06N 3/0454 |
| 2017/0347026 A1 | 11/2017 | Hannuksela | |
| 2018/0131953 A1 | 5/2018 | Wang et al. | |
| 2018/0144447 A1* | 5/2018 | Tate | G06T 5/50 |
| 2018/0373986 A1* | 12/2018 | Rainwater | G06F 11/36 |
| 2019/0057301 A1* | 2/2019 | Pantazi | G06N 3/049 |
| 2019/0114537 A1* | 4/2019 | Wesolowski | G06N 3/08 |
| 2020/0034685 A1* | 1/2020 | Kempf | G06N 3/08 |
| 2020/0145661 A1* | 5/2020 | Jeon | H04N 19/136 |
| 2020/0236349 A1* | 7/2020 | Zhai | H04N 19/176 |

FOREIGN PATENT DOCUMENTS

| | | |
|---|---|---|
| EP | 3493149 A1 | 6/2019 |
| EP | 3584676 A1 | 12/2019 |
| GB | 2548749 A | 9/2017 |
| WO | 9962265 A1 | 12/1999 |
| WO | 2014018050 A1 | 1/2014 |
| WO | 2016132152 A1 | 8/2016 |
| WO | 2018229490 A1 | 12/2018 |
| WO | 2019009449 A1 | 1/2019 |
| WO | 2019009489 A1 | 1/2019 |
| WO | 2019182703 A1 | 9/2019 |
| WO | 2019197712 A1 | 10/2019 |
| WO | 2019220095 A1 | 11/2019 |

OTHER PUBLICATIONS

Shen et al., "Down-sampling based video coding using super-resolution technique." IEEE Transactions on Circuits and Systems for Video Technology21.6 (2011): 755-765.

Dar et al., "Improving low bit-rate video coding using spatio-temporal down-scaling." arXiv preprint arXiv:1404.4026 (2014).

Nguyen et al., Adaptive downsampling/upsampling for better video compression at low bit rate. Circuits and Systems, 2008. ISCAS 2008. IEEE International Symposium on. IEEE, 2008.

Hinton et al. "Reducing the dimensionality of data with neural networks." science313.5786 (2006): 504-507.

Van Den Oord et al. "Conditional image generation with pixelcnn decoders." Advances in Neural Information Processing Systems. 2016.

Theis et al., "Lossy image compression with compressive autoencoders." arXiv preprint arXiv: 1703.00395(2017).

Wu et al., "Video Compression through Image Interpolation." arXiv preprint arXiv: 1804.06919 (2018).

Rippel et al., "Real-time adaptive image compression." arXiv preprint arXiv: 1705.05823 (2017).

Golub et al., Matrix computations. vol. 3. JHU Press, 2012.

Timofte et al., "NTIRE 2017 challenge on single image super-resolution: Methods and results," Proc. Comp. Vis. and Pattern Recognition Workshops (CVPRW), 2017 IEEE Conf. on Comp. Vis. and Pattern Recognition, CVPR, IEEE, 2017, https://goo.gl/TQRT7E.

Lim et al. "Enhanced deep residual networks for single image super-resolution," Proc. Comp. Vis. and Pattern Recognition Workshops (CVPRW), 2017 IEEE Conf. on Comp. Vis. and Pattern Recogn., CVPR, IEEE, 2017, https://goo.gl/PDSTiV.

Dong, et al., "Accelerating the super-resolution convolutional neural network," Proc. 2016 IEEE Conf. on Comp. Vis. and Pattern Recognition, CVPR, IEEE, 2016, https://goo.gl/Qa1UmX.Dong, Jie, and Yan Ye. "Adaptive downsampling for high-definition video coding." IEEE Transactions on Circuits and Systems for Video Technology 24.3 (2014): 480-488.

Dong et al., "Learning a deep convolutional network for image super-resolution," Proc. ECCV (2014) 184-199.

Dong et al., "Image super-resolution using deep convolutional networks," IEEE TPAMI 38(2) (2015) 295-307.

Yang et al., "Fast direct super-resolution by simple functions," Proc. ICCV. (2013) 561-568.

Dong et al., Accelerating the Super-Resolution Convolutional Neural Network, Proc. ICCV (2016).

Han et al., "Deep compression: Compressing deep neural networks with pruning, trained quantization and huffman coding," arXiv preprint arXiv: 1510.00149 (2015).

Han, et al., "Learning both weights and connections for efficient neural network," Advances in neural information processing systems. 2015.

Iandola, et al., "SqueezeNet: AlexNet-level accuracy with 50x fewer parameters and< 0.5 MB model size," arXiv preprint arXiv:1602.07360 (2016).

LeCun et al., "Deep learning," Nature, vol. 521, No. 7553, 2015.

Abadi et al., "TensorFlow: A system for large-scale machine learning," Proc. 12th USENIX Symp. on Oper. Syst. Des. and Implem. (OSDI), Savannah, Georgia, USA. 2016.

Simonyan et al., "Two-stream convolutional networks for action recognition in videos," Proc. Advances in Neural Inf. Process. Syst., NIPS, 2014.

Sze, et al., "Hardware for machine learning: Challenges and opportunities," arXiv preprint, arXiv:1612.07625, 2016.

Zhang, et al., "Optimizing FPGA-based accelerator design for deep convolutional neural networks," Proc. ACM/SIGDA Int. Symp. Field-Prog. Gate Arr., FPGA. ACM, 2015.

Chen, et al., "DianNao: A small-footprint high-throughput accelerator for ubiquitous machine-learning," Proc. ASPLOS, 2014.

Shafiee et al., "ISAAC: A convolutional neural network accelerator with in-situ analog arithmetic in crossbars," Proc. IEEE Int. Symp. on Comp. Archit., ISCA, 2016.

Chi, et al., "PRIME: A novel processing-in-memory architecture for neural network computation in ReRAM-based main memory," Proc. IEEE Int. Symp. on Comp. Archit., ISCA, 2016.

Park, et al., "A 1.93TOPS/W scalable deep learning/inference processor with tetra-parallel MIMD architecture for big-data applications," Proc. ISSCC, 2015.

Cavigelli, et al., "Origami: A convolutional network accelerator," Proc. GLVLSI, 2015.

(56) References Cited

OTHER PUBLICATIONS

Mathieu, et al., "Fast training of convolutional networks through FFTs," Proc. ICLR, 2014.
Yang, et al., "Designing energy-efficient convolutional neural networks using energy-aware pruning," arXiv preprint arXiv:1611.05128, 2016.
Hsu, "For sale: deep learning," IEEE Spectrum, vol. 53, No. 8, pp. 12-13, Aug. 2016.
Han, et al., "Deep compression: Compressing deep neural network with pruning, trained quantization and Huffman coding," Proc. ICLR, 2016.
Chen et al., "Eyeriss: An energy-efficient reconfigurable accelerator for deep convolutional neural networks," Proc. ISSCC, 2016.
Courbariaux et al., "Binarynet: Training deep neural networks with weights and activations constrained to +1 or −1," arXiv preprint, arXiv: 1602.02830, 2016.
Deng et al., "Image aesthetic assessment: An experimental survey," IEEE Signal Processing Magazine, 34(4), pp. 80-106, 2017.
Yu et al., "Multi-scale context aggregation by dilated convolutions," arXiv preprint arXiv:1511.07122, 2015.
Goodfellow et al., "Generative adversarial nets," in Advances in neural information processing systems, 2014.
Salimans et al, "Improved techniques for training gans," in Advances in neural information processing systems, 2016.
Mao et al., "Least squares generative adversarial networks," in Proceedings of the IEEE International Conference on Computer Vision, 2017.
Jolicoeur-Martineau, "The relativistic discriminator: a key element missing from standard GAN," arXiv preprint arXiv: 1807.00734, 2018.
Arjovsky et al., Wasserstein gan, arXiv preprint arXiv:1701.07875, 2017.
Gulrajani et al., "Improved training of wasserstein gans," in Advances in neural information processing systems, 2017.
Mroueh et al., "Fisher gan," in Advances in Neural Information Processing Systems, 2017.
Suehring et al., HHIAVC reference code repository, online at the HHI website, https://avc.hhi.fraunhofer.de/.
Bjontegaard, "Calculation of average PSNR differences between RD-curves," VCEG-M33 (2001).
Wang et al., "SSIM-motivated rate-distortion optimization for video coding." IEEE Transactions on Circuits and Systems for Video Technology 22.4 (2011): 516-529.
Li, et al. "Delay-power-rate-distortion optimization of video representations for dynamic adaptive streaming." IEEE Transactions on Circuits and Systems for Video Technology 28.7 (2017): 1648-1664.
Helmrich, et al. "Perceptually Optimized Bit-Allocation and Associated Distortion Measure for Block-Based Image or Video Coding." 2019 Data Compression Conference (DCC). IEEE, 2019.
Xu et al. "CNN-based rate-distortion modeling for H. 265/HEVC." 2017 IEEE Visual Communications and Image Processing (VCIP). IEEE, 2017.
Zhu et al., "Spatiotemporal visual saliency guided perceptual high efficiency video coding with neural network." Neurocomputing 275 (2018): 511-522.
Bourtsoulatze et al., "Deep video precoding," IEEE Trans. on Circ. and Syst. for Video Technol., to appear in 2020.
Ronneberger et al., U-net: Convolutional networks for biomedical image segmentation, International Conference on Medical image computing and computer-assisted intervention. Springer, Cham, 2015.
Varghese et al. "e-DASH: Modelling an energy-aware DASH player." 2017 IEEE 18th International Symposium on a World of Wireless, Proc. IEEE Mobile and Multimedia Networks (WoWMoM), 2017.
Massouh, et al. "Experimental study on luminance preprocessing for energy-aware HTTP-based mobile video streaming." Proc. IEEE 2014 5th European Workshop on Visual Information Processing (EUVIP).
Hu et al., "Energy-aware video streaming on smartphones." Proc. IEEE Conf. on Computer Communications (INFOCOM). IEEE, 2015.
Almowuena, et al. "Energy-aware and bandwidth-efficient hybrid video streaming over mobile networks." IEEE Trans. on Multimedia 18.1 (2015): 102-115.
Mehrabi, et al. "Energy-aware QoE and backhaul traffic optimization in green edge adaptive mobile video streaming." IEEE Trans, on Green Communications and Networking 3.3 (2019): 828-839.
European Search Report for European Patent Application No. EP20199342, dated Oct. 16, 2020, 4 pages.
European Search Report for European Patent Application No. EP20199345, dated Nov. 18, 2020, 6 pages.
Anonymous: "Autoencoder", Wikipedia, retrieved from the Internet: URL:https://en.wikipedia.org/w/index.php?title=Autoencoder&direction=prev&oldid=930342212, retrieved Mar. 5, 2020, 13 pages.
European Search Report for European Patent Application No. EP20199344, dated Oct. 16, 2020, 4 pages.
European Search Report for European Patent Application No. EP201993447 dated Oct. 23, 2020, 4 pages.
European Search Report for European Patent Application No. EP20199349, dated Oct. 23, 2020, 6 pages.

* cited by examiner

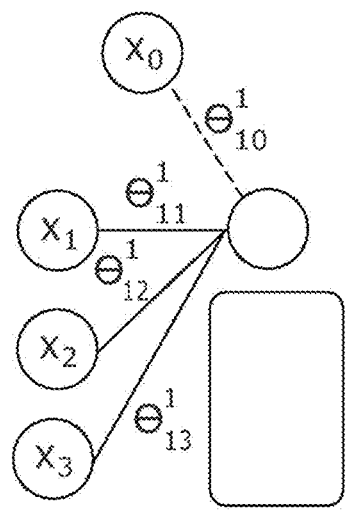

$$g(\Theta_{10}^1 x_0 + \Theta_{11}^1 x_1 + \Theta_{12}^1 x_2 + \Theta_{13}^1 x_3)$$

$\Theta_{13}^1$ means:

1 (superscript) - mapping from layer 1
1 - mapping to node 1 in layer 2 (L+1)
3 - mapping from node 3 in layer 1 (L)

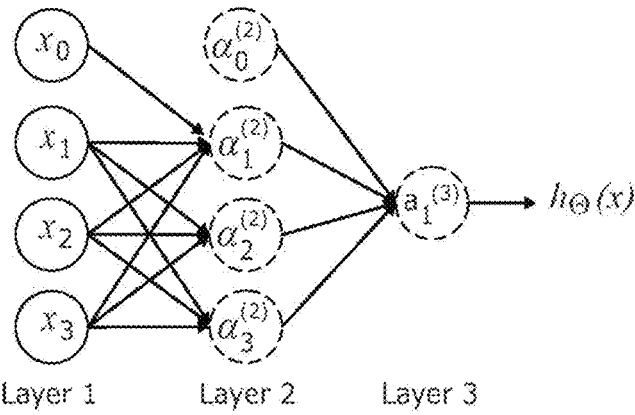

Figure 2(b)

Layer 1    Layer 2    Layer 3

$$a_1^{(2)} = g(\Theta_{10}^{(1)} x_0 + \Theta_{11}^{(1)} x_1 + \Theta_{12}^{(1)} x_2 + \Theta_{13}^{(1)} x_3)$$

$$a_2^{(2)} = g(\Theta_{20}^{(1)} x_0 + \Theta_{21}^{(1)} x_1 + \Theta_{22}^{(1)} x_2 + \Theta_{23}^{(1)} x_3)$$

$$a_3^{(2)} = g(\Theta_{30}^{(1)} x_0 + \Theta_{31}^{(1)} x_1 + \Theta_{32}^{(1)} x_2 + \Theta_{33}^{(1)} x_3)$$

$$h_\Theta(x) = a_1^{(3)} = g(\Theta_{10}^{(2)} a_0^{(2)} + \Theta_{11}^{(2)} a_1^{(2)} + \Theta_{12}^{(2)} a_2^{(2)} + \Theta_{13}^{(2)} a_3^{(2)})$$

PREPROCESSING IMAGE DATA

CROSS-REFERENCE TO RELATED APPLICATIONS

This application claims the benefit of U.S. Provisional Patent Application Nos. 62/957,286, filed on Jan. 5, 2020, 62/962,971, filed on Jan. 18, 2020, 62/962,970, filed on Jan. 18, 2020, 62/971,994, filed on Feb. 9, 2020, 63/012,339, filed on Apr. 20, 2020, and 63/023,883, filed on May 13, 2020, the entire contents of each of which is incorporated herein by reference.

INTRODUCTION

Technical Field

The present disclosure concerns computer-implemented methods of preprocessing image data prior to encoding with an external encoder. The disclosure is particularly, but not exclusively, applicable where the image data is video data.

Background

When a set of images or video is sent over a dedicated IP packet switched or circuit-switched connection, a range of streaming and encoding recipes must be selected in order to ensure the best possible use of the available bandwidth. To achieve this, (i) the image or video encoder must be tuned to provide for some bitrate control mechanism; and (ii) the streaming server must provide for the means to control or switch the stream when the bandwidth of the connection does not suffice for the transmitted data. Methods for tackling bitrate control include: constant bitrate (CBR) encoding, variable bitrate (VBR) encoding, or solutions based on a video buffer verifier (VBV) model [9]-[12], such as QVBR, CABR, capped-CRF, etc. These solutions control the parameters of the adaptive quantization and intra-prediction or inter-prediction per image [9]-[12] in order to provide the best possible reconstruction accuracy for the decoded images or video at the smallest number of bits. Methods for tackling stream adaptation are the DASH and HLS protocols—namely, for the case of adaptive streaming over HTTP. Under adaptive streaming, the adaptation comprises the selection of a number of encoding resolutions, bitrates and encoding templates (discussed previously). Therefore, the encoding and streaming process is bound to change the frequency content of the input video and introduce (ideally) imperceptible or (hopefully) controllable quality loss in return for bitrate savings. This quality loss is measured with a range of quality metrics, ranging from low-level signal-to-noise ratio metrics, all the way to complex mixtures of expert metrics that capture higher-level elements of human visual attention and perception. One such metric that is now well-recognised by the video community and the Video Quality Experts Group (VQEG) is the Video Multi-method Assessment Fusion (VMAF), proposed by Netflix. There has been a lot of work in VMAF to make it a "self-interpretable" metric: values close to 100 (e.g. 93 or higher) mean that the compressed content is visually indistinguishable from the original, while low values (e.g. below 70) mean that the compressed content has significant loss of quality in comparison to the original. It has been reported [Ozer, Streaming Media Mag., "Buyers' Guide to Video Quality Metrics", Mar. 29, 2019] that a difference of around 6 points in VMAF corresponds to the so-called Just-Noticeable Difference (JND), i.e. quality difference that will be noticed by the viewer.

The process of encoding and decoding with a standard image or video encoder always requires the use of linear filters for the production of the decoded (and often upscaled) content that the viewer sees on their device. However, this tends to lead to uncontrolled quality fluctuation in video playback, or poor-quality video playback in general. The viewers most often experience this when they happen to be in an area with poor 4G/WiFi signal strength, where the high-bitrate encoding of a 4K stream will quickly get switched to a much lower-bitrate/lower-resolution encoding, which the decoder and video player will keep on upscaling to the display device's resolution while the viewer continues watching.

Technical solutions to this problem can be grouped into three distinct categories.

The first type of approaches consists of solutions attempting device-based enhancement, i.e. advancing the state-of-the-art in intelligent video upscaling at the video player when the content has been "crudely" downscaled using a linear filter like the bicubic or variants of the Lanczos or other polyphase filters [9]-[12] and adaptive filters [13]-[15]. Several of these products are already in the market, including SoC solutions embedded within the latest 8K televisions. While there have been some advances in this domain [13]-[15], this category of solutions is limited by the stringent complexity constraints and power consumption limitations of consumer electronics. In addition, since the received content at the client is already distorted from the compression (quite often severely so), there are theoretical limits to the level of picture detail that can be recovered by client-side upscaling.

A second family of approaches consists of the development of bespoke image and video encoders, typically based on deep neural networks [16]-[20]. This deviates from encoding, stream-packaging and stream-transport standards and creates bespoke formats, so has the disadvantage of requiring bespoke transport mechanisms and bespoke decoders in the client devices. In addition, in the 50+ years video encoding has been developed most opportunities for improving gain in different situations have been taken, thereby making the current state-of-the-art in spatio-temporal prediction and encoding very difficult to outperform with neural-network solutions that are designed from scratch and learn from data.

The third family of methods comprises perceptual optimization of existing standards-based encoders by using perceptual metrics during encoding. Here, the challenges are that: i) the required tuning is severely constrained by the need for compliance to the utilized standard; ii) many of the proposed solutions tend to be limited to focus-of-attention models or shallow learning methods with limited capacity, e.g. assuming that the human gaze is focusing on particular areas of the frame (for instance, in a conversational video we tend to look at the speaker(s), not the background) or using some hand-crafted filters to enhance image slices or groups of image macroblocks prior to encoding; and iii) such methods tend to require multiple encoding passes, thereby increasing complexity.

Because of these issues, known designs are very tightly coupled to the specific encoder implementation. Redesigning them for a new encoder and/or new standard, e.g., from HEVC to VP9 encoding, can require substantial effort.

The present disclosure seeks to solve or mitigate some or all of these above-mentioned problems. Alternatively and/or additionally, aspects of the present disclosure seek to provide improved image and video encoding and decoding methods, and in particular methods that can be used in combination with existing image and video codec frameworks.

SUMMARY

In accordance with a first aspect of the disclosure there is provided a computer-implemented method of preprocessing, prior to encoding with an external encoder, image data using a preprocessing network comprising a set of inter-connected learnable weights, the method comprising: receiving, at the preprocessing network, image data from one or more images; and processing the image data using the preprocessing network to generate an output pixel representation for encoding with the external encoder, wherein the preprocessing network is configured to take as an input encoder configuration data representing one or more configuration settings of the external encoder, and wherein the weights of the preprocessing network are dependent upon the one or more configuration settings of the external encoder.

By conditioning the weights of the preprocessing network on the configuration settings of the external encoder, the representation space can be partitioned within a single model, reducing the need to train multiple models for every possible encoder setting, and reducing the need to redesign and/or reconfigure the preprocessing model for a new encoder and/or a new standard, e.g. from HEVC to VP9 encoding. The methods described herein include a preprocessing model that exploits knowledge of encoding parameters and characteristics to tune the parameters and/or operation of the preprocessing model. This enables the preprocessing of the image data to be performed optimally in order to make the external encoder (which may be a standards-based encoder) operate as efficiently as possible, by exploiting the knowledge of the characteristics and configuration settings of the encoder.

Further, by using a preprocessing network conditioned on the configuration settings of the external encoder, a visual quality of the subsequently encoded and decoded image data may be improved for a given encoding bitrate, and/or an encoding bitrate to achieve a given visual quality may be reduced. Fidelity of the subsequently encoded and decoded image data to the original image data may also be improved through use of the methods described herein.

The described methods include technical solutions that are learnable based on data and can utilize a standard image/video encoder with a predetermined encoding recipe for bitrate, quantization and temporal prediction parameters, and fidelity parameters. An overall technical question addressed can be abstracted as: how to optimally preprocess (or "precode") the pixel stream of a video into a (typically) smaller pixel stream, in order to make standards-based encoders as efficient (and fast) as possible? This question may be especially relevant where the client device can upscale the content with its existing linear filters, and/or where perceptual quality is measured with the latest advances in perceptual quality metrics from the literature, e.g., using VMAF or similar metrics.

In embodiments, the one or more configuration settings comprise at least one of a bitrate, a quantization, or a target fidelity of encoding performed by the external encoder.

Advantageously, the weights of the preprocessing network are trained using end-to-end back-propagation of errors. The errors are calculated using a cost function indicative of an estimated image error associated with encoding the output pixel representation using the external encoder configured according to the one or more configuration settings (or configured with settings similar to the one or more configuration settings).

In embodiments, the cost function is indicative of an estimate of at least one of: an image noise of the output of decoding the encoded output pixel representation; a bitrate to encode the output pixel representation; or a perceived quality of the output of decoding the encoded output pixel representation. As such, the preprocessing network may be used to reduce noise in the final displayed image(s), reduce the bitrate to encode the output pixel representation, and/or improve the visual quality of the final displayed image(s).

In embodiments, the estimated image error is indicative of the similarity of the output of decoding the encoded output pixel representation to the received image data based on at least one reference-based quality metric, the at least one reference based quality metric comprising at least one of: an elementwise loss function such as mean squared error, MSE; a structural similarity index metric, SSIM; or a visual information fidelity metric, VIF. As such, the preprocessing network may be used to improve the fidelity of the final displayed image(s) relative to the original input image(s). In embodiments, the weights of the preprocessing network are trained in a manner that balances perceptual quality of the post-decoded output with fidelity to the original image.

In embodiments, the cost function is formulated using an adversarial learning framework, in which the preprocessing network is encouraged to generate output pixel representations that reside on the natural image manifold. As such, the preprocessing network is trained to produce images which lie on the natural image manifold, and/or to avoid producing images which do not lie on the natural image manifold (and which may look artificial or unrealistic). This facilitates an improvement in user perception of the subsequently displayed image(s).

In embodiments, the weights of the preprocessing network are trained using training image data, prior to deployment of the preprocessing network, based on a random initialization or a prior training phase.

In embodiments, the weights of the preprocessing network are trained using image data obtained during deployment of the preprocessing network. As such, the weights of the preprocessing network may be adjusted and/or reconfigured after the initial training phase, using additional image data. This can enable the preprocessing network to adapt to new encoder settings, new external encoders, and/or new types of image content, thereby improving the flexibility of the preprocessing network.

In embodiments, the resolution of the received image data is different to the resolution of the output pixel representation. For example, the resolution of the output pixel representation may be lower than the resolution of the received image data. By downscaling the image prior to using the external encoder, the external encoder can operate more efficiently by processing a lower resolution image. Moreover, the parameters used when downscaling/upscaling can be chosen to provide different desired results, for example to improve accuracy (i.e. how similarly the recovered images are to the original). Further, the downscaling/upscaling process may be designed to be in accordance with downscaling/upscaling performed by the external encoder, so that the downscaled/upscaled images can be encoded by the external encoder without essential information being lost.

Advantageously, the preprocessing network comprises an artificial neural network including multiple layers having a convolutional architecture, with each layer being configured to receive the output of one or more previous layers.

In embodiments, the outputs of each layer of the preprocessing network are passed through a non-linear parametric linear rectifier function, pReLU. Other non-linear functions may be used in other embodiments.

In embodiments, the preprocessing network comprises a dilation operator configured to expand a receptive field of a convolutional operation of a given layer of the preprocessing network. Increasing the receptive field allows for integration of larger global context.

In embodiments, the weights of the preprocessing network are trained using a regularization method that controls the capacity of the preprocessing network, the regularization method comprising using hard or soft constraints and/or a normalization technique on the weights that reduces a generalization error.

Preferably, the one or more images are downscaled using one or more filters. A filter of the one or more filters may be an edge-detection filter. Alternatively and/or additionally, a filter of the one or more filters is a blur filter. The blur filter may be a Gaussian blur filter, for example.

In embodiments, the output pixel representation is encoded using the external encoder. The external encoder may be configured according to the one or more configuration settings that are input to the preprocessing network, or may be configured according to configuration settings that are similar to, but not identical to, the configuration settings that are input to the preprocessing network. In embodiments, the encoded pixel representation is output for transmission, for example to a decoder, for subsequent decoding and display of the image data. In alternative embodiments, the encoded pixel representation is output for storage.

In accordance with another aspect of the disclosure, there is provided a computer-implemented method of preprocessing one or multiple images into output pixel representations that can subsequently be encoded with any external still-image or video encoder. The preprocessing comprises a set of weights inter-connected in a network (termed as "preprocessing network") that ingests: (i) the input pixels from the single or plurality of images; (ii) the external encoder configuration settings corresponding to bitrate, quantization or target fidelity of the encoding. If these encoding configuration settings are not known precisely, then approximations can be provided. These settings can be average settings for an entire video, or can be provided per scene, per individual frame, or even per segment of an individual frame or image.

Preferably, the preprocessing network is configured to convert input pixels of each frame to output pixel representations by applying the network weights on the input pixels and accumulating the result of the output product and summation between weights and subsets of input pixels. The network weights, as well as offset or bias terms used for sets of one or more weights, are conditioned on the aforementioned bitrate, quantization or fidelity settings. The weights are updated via a training process that uses end-to-end back-propagation of errors computed on the outputs to each group of weights, biases and offsets based on the network connections. The output errors are computed via a cost function that estimates the image or video frame error after encoding and decoding the output pixel representation of the preprocessing network with the aforementioned external encoder using bitrate, quantization or fidelity settings close to, or identical to, the ones used as inputs to the network.

Advantageously, the utilized cost function may comprise multiple terms that, for the output after decoding, express at least one of: image or video frame noise estimates; functions that estimate the rate to encode the image or video frame; or estimates or functions expressing the perceived quality of the output from human viewers. The preprocessing network and cost-function components are trained or refined for any number of iterations prior to deployment (offline) based on training data or, optionally, have their training fine-tuned for any number of iterations based on data obtained during the preprocessing network and encoder-decoder operation during deployment (online).

The disclosed preprocessing network can optionally increase or decrease the resolution of the pixel data in accordance to a given upscaling or downscaling ratio. The ratio can be an integer or fractional number and also includes ratio of 1 (unity) that corresponds to no resolution change. For example, ratio of 2/3 and input image resolution equal to 1080p (1920×1080 pixels, with each pixel comprising 3 color values) would correspond to the output being an image of 720p resolution (1280×720 pixels).

In terms of the structure of the preprocessing network connections, the network can optionally be structured in a cascaded structure of layers of activations. Each activation in each layer can be connected to any subset (or the entirety) of activations of the next layer, or a subsequent layer by a function determined by the layer weights. In addition, the network can optionally comprise a single or multiple layers of a convolutional architecture, with each layer taking the outputs of the previous layer and implementing a filtering process via them that realizes the mathematical operation of convolution. In addition, some or all the outputs of each layer can optionally be passed through a non-linear parametric linear rectifier function (pReLU) or other non-linear functions that include, but are not limited to, variations of the sigmoid function or any variation of functions that produce values based on threshold criteria.

In embodiments, some or all of the convolutional layers of the preprocessing architecture can include implementations of dilation operators that expand the receptive field of the convolutional operation per layer. In addition, the training of the preprocessing network weights can be done with the addition of regularization methods that control the network capacity, via hard or soft constraints or normalization techniques on the layer weights or activations that reduces the generalization error but not the training error.

Preferably, the utilized cost functions can express the fidelity to the input images based on reference-based quality metrics that include one or more of: elementwise loss functions such as mean squared error (MSE); the sum of absolute errors or variants of it; the structural similarity index metric (SSIM); the visual information fidelity metric (VIF) from the published work of H. Sheikh and A. Bovik entitled "Image Information and Visual Quality", the detail loss metric (DLM) from the published work of S. Li, F. Zhang, L. Ma, and K. Ngan entitled "Image Quality Assessment by Separately Evaluating Detail Losses and Additive Impairments"; variants and combinations of these metrics; cost functions that express or estimate quality scores attributed to the output images from human viewers; and/or cost functions formulated via an adversarial learning framework, in which the preprocessing network is encouraged to generate output pixel representations that reside on the natural image manifold (and potentially encouraged to reside away from another non-representative manifold); one such example of an adversarial learning framework is the generative adversarial network (GAN), in which the preprocessing network represents the generative component.

In terms of the provided image or video encoder parameters, these can include quantization or fidelity values per input image, or constant rate factor (CRF) values from a video encoder, or bit allocation budgets per input image, or any combination of these. Moreover, the utilized encoder is a standards-based image or video encoder such as an ISO JPEG or ISO MPEG standard encoder, or a proprietary or royalty-free encoder, such as, but not limited to, an AOMedia encoder.

Furthermore, either before encoding or after decoding, high resolution and low resolution image or video pairs can optionally be provided and the low resolution image upscaled and optimized to improve and/or match quality or rate of the high resolution image using the disclosed methods as the means to achieve this. In the optional case of this being applied after decoding, this corresponds to a component on the decoder (client side) that applies such processing after the external decoder has provided the decoded image or video frames.

In terms of training process across time, the training of the preprocessing network weights, and any adjustment to the cost functions are performed at frequent or in-frequent intervals with new measurements from quality, bitrate, perceptual quality scores from humans, or encoded image data from external image or video encoders, and the updated weights and cost functions replace the previously-utilized ones.

In embodiments, the external encoder comprises an image codec. In embodiments, the image data comprises video data and the one or more images comprise frames of video. In embodiments, the external encoder comprises a video codec.

The methods of processing image data described herein may be performed on a batch of video data, e.g. a complete video file for a movie or the like, or on a stream of video data.

In accordance with another aspect of the disclosure there is provided a computing device comprising: a processor; and memory; wherein the computing device is arranged to perform using the processor any of the methods of preprocessing image data described above.

In accordance with another aspect of the disclosure there is provided a computer program product arranged, when executed on a computing device comprising a process or memory, to perform any of the method of preprocessing image data described above.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings of which:

FIGS. 2(a) to 2(d) are schematic diagrams showing a preprocessing network in accordance with embodiments;

DETAILED DESCRIPTION

Embodiments of the present disclosure are now described.

Figure 1:
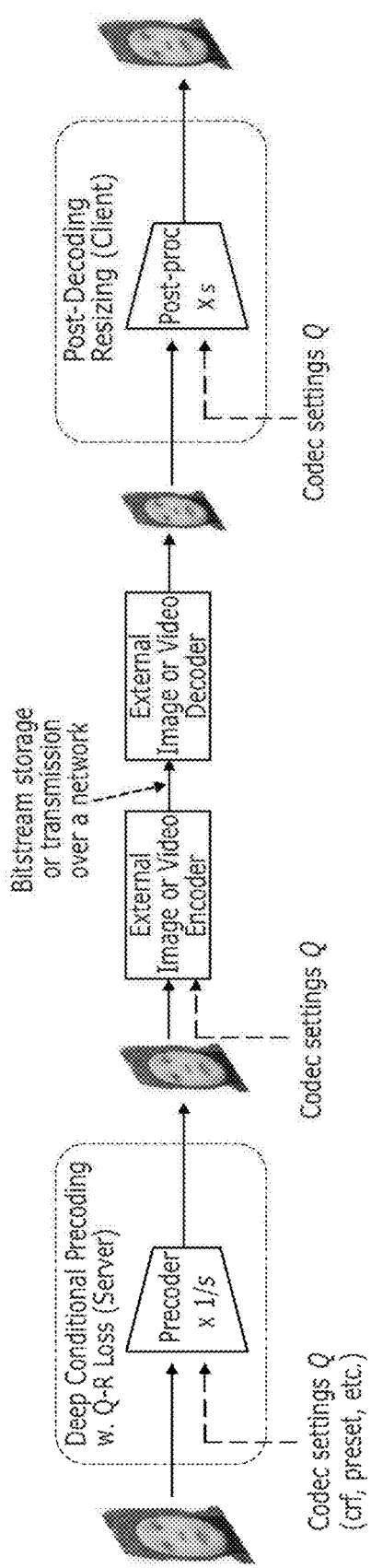
FIG. 1 is a schematic diagram of a method of processing image data in accordance with embodiments.

FIG. 1 is a schematic diagram showing a method of processing image data, according to embodiments. Image or video input data is pre-processed by a conditional "precoder" prior to passing to an external image or video codec. The embodiments depicted are applicable to batch processing, i.e. processing a group of images or video frames together without delay constraints (e.g. an entire video sequence), as well as to stream processing, i.e. processing only a limited subset of a stream of images or video frames, or even a select subset of a single image, e.g. due to delay or buffering constraints. The method depicted in FIG. 1 includes deep conditional precoding with quality-rate score optimization (and optional resizing) within the transmission pipeline. In embodiments, all components in the transmission pipeline take codec settings Q as input. In alternative embodiments, some of the components do not take the codec settings as an input.

Figure 2C:
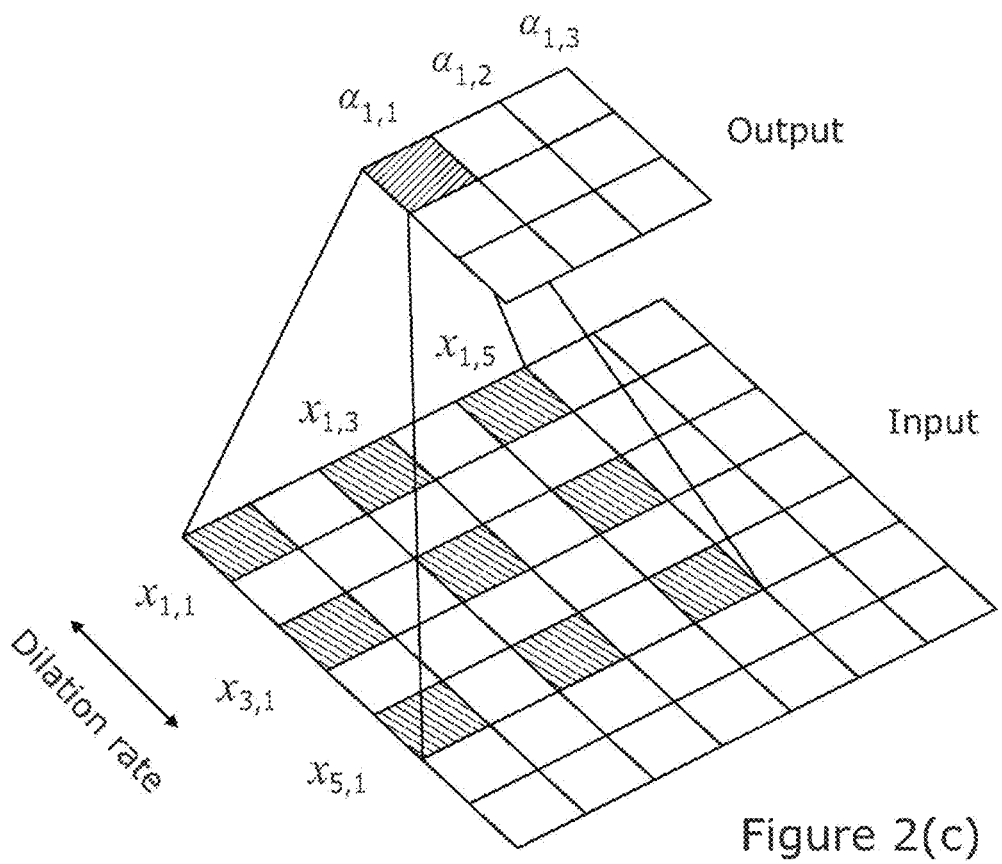
Figure 2D:
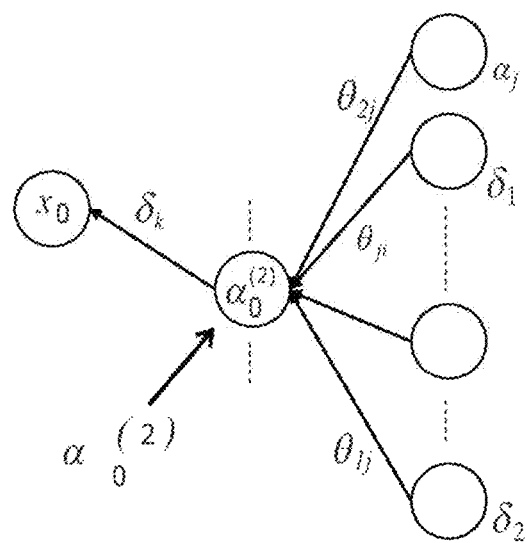

Embodiments comprise a deep conditional precoding model that processes input image or video frames. The deep conditional precoding (and optional post-processing) depicted in FIG. 1 can comprise any combination of learnable weights locally or globally connected in a network with a non-linear activation function. An example of such weights is shown in FIG. 2(a) and an associated example in FIG. 2(b) depicts global connectivity between weights and inputs. That is, FIG. 2(a) shows a combination of inputs $x_0, \ldots, x_3$ with weight coefficients $\Theta$ and non-linear activation function $g( )$, and FIG. 2(b) is a schematic diagram showing layers of interconnected activations and weights, forming an artificial neural network with global connectivity. An instantiation of local connectivity between weights and inputs is shown in FIG. 2(c) for a 2D dilated convolution [1], 3×3 kernel, and dilation rate of 2. As such, FIG. 2(c) is a schematic diagram of 2D dilated convolutional layer with local connectivity. FIG. 2(d) is a schematic diagram of back-propagation of errors 6 from an intermediate layer (right hand side of FIG. 2(d)) to the previous intermediate layer using gradient descent.

Figure 3:
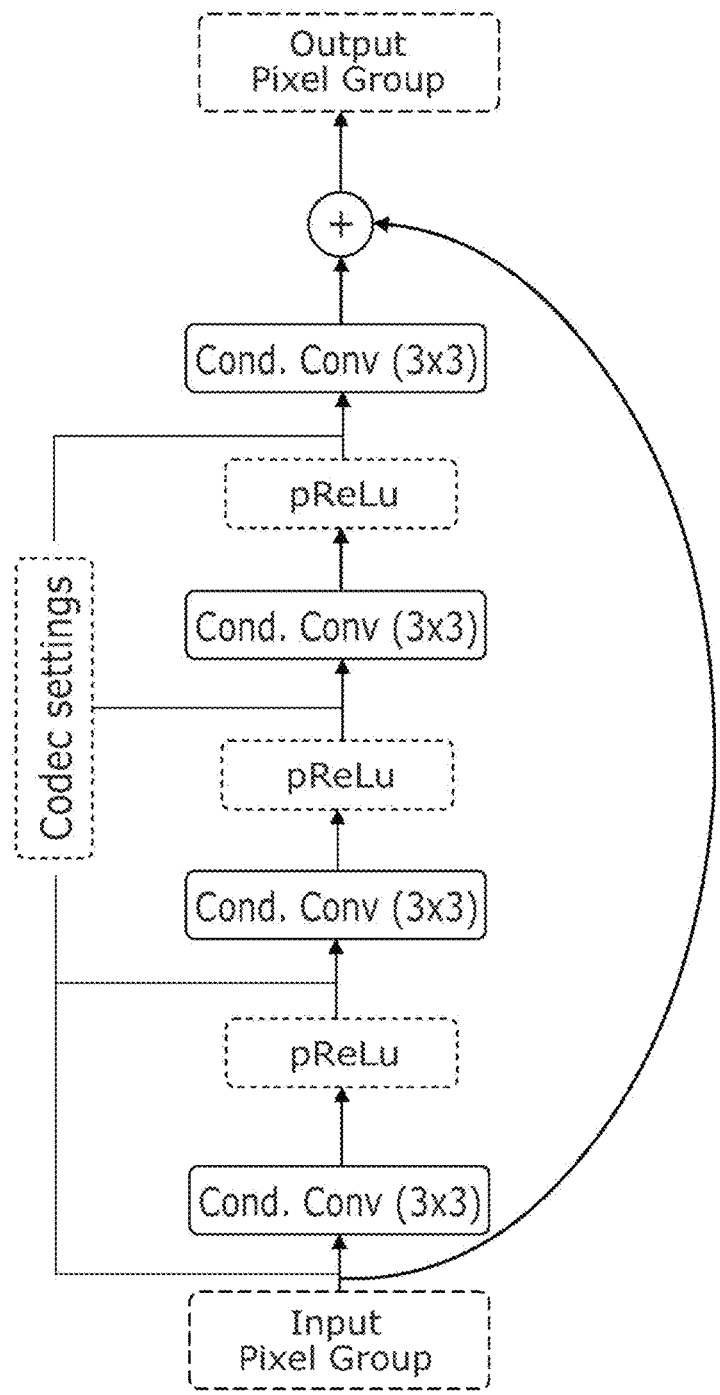
FIG. 3 is a schematic diagram showing a preprocessing network in accordance with embodiments.

An example of the deep conditional precoding model is shown in FIG. 3. It consists of a series of conditional convolutional layers and elementwise parametric ReLu (pReLu) layers of weights and activations. As such, FIG. 3 shows a cascade of conditional convolutional and parametric ReLu (pReLu) layers mapping input pixel groups to transformed output pixel groups. All layers receive codec settings as input, along with the representation from the previous layer There is also an optional skip connection between the input and output layer. Each conditional convolution takes the output of the preceding layer as input (with the first layer receiving the image as input), along with intended user settings for the external image or video codec, encoded as a numerical representation. For image precoding for an image codec, these user settings can include but are not limited to quality factor or discrete cosine transform (DCT) block size. Alternatively, for video precoding for a standard video codec such as HEVC, these user settings can include but are not limited to constant rate factor (CRF), quantization parameter (QP), maximum bitrate or preset setting.

Figure 4:
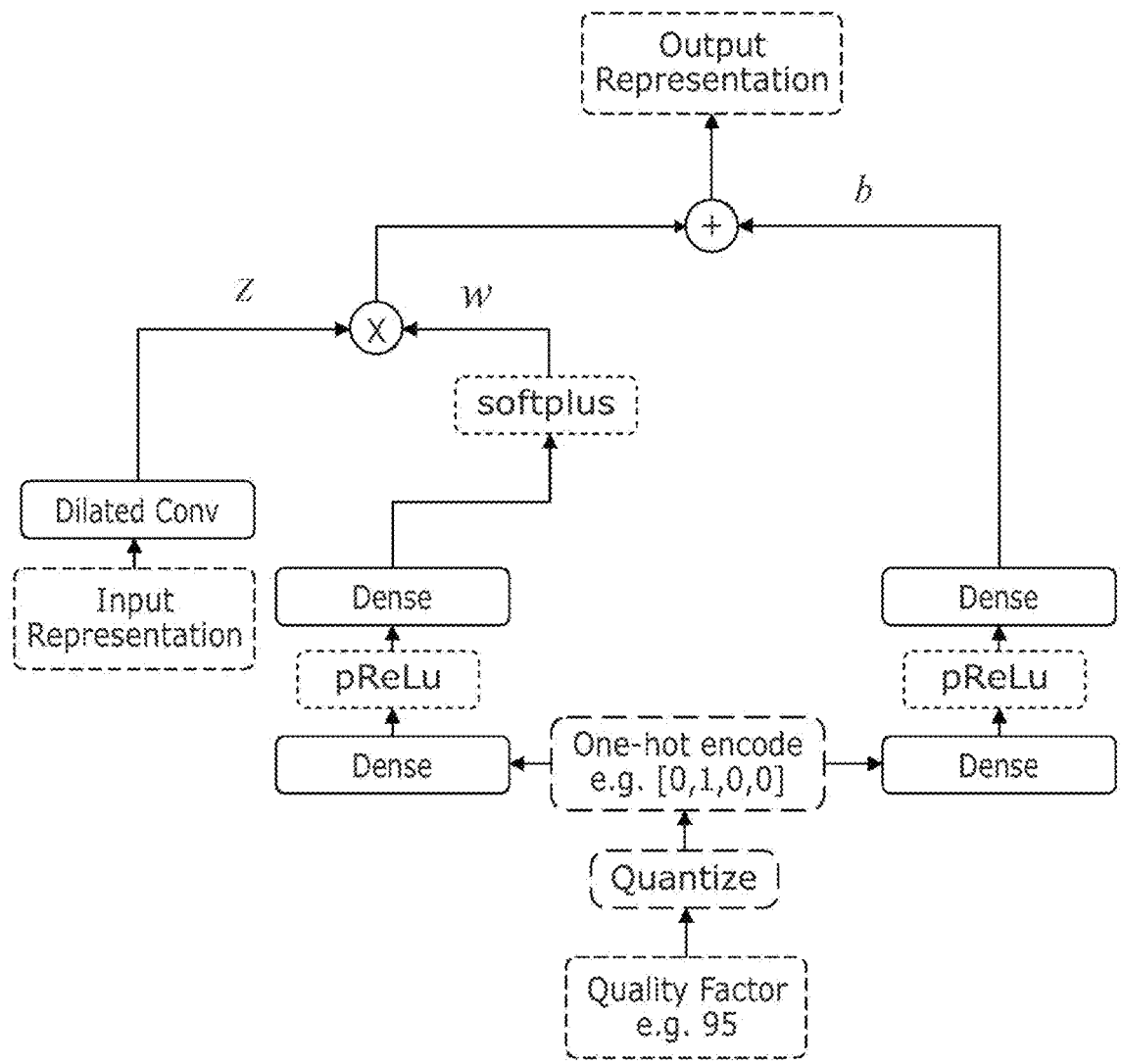
FIG. 4 is a schematic diagram showing a convolutional layer of a preprocessing network in accordance with embodiments.

FIG. 4 is a schematic diagram of a conditional convolutional layer for the case of JPEG encoding. The layer receives the quality factor as input which is quantized and one-hot encoded. The one hot encoded vector is then mapped to intermediate representations w and b, which respectively weight and bias the channels of the output of the dilated convolutional layer z. In the example for conditional convolutional layers for JPEG encoding shown in FIG. 4, the user selects a JPEG quality factor, which is quantized and one-hot encoded. The one-hot encoding is then mapped via linear or non-linear functions, such as densely connected layers (following the connectivity illustrated in FIG. 2($b$)), to vector representations. These vector representations are then used to weight and bias the output of a dilated convolution—thus conditioning the dilated convolution on the user settings.

Conditioning the precoding on user settings enables a partitioning of the representation space within a single model without having to train multiple models for every possible user setting. An example of the connectivity per dilated convolution is illustrated in FIG. 2($c$). The dilation rate (spacing between each learnable weight in the kernel), kernel size (number of learnable weights in the kernel per dimension) and stride (step per dimension in the convolution operation) are all variable per layer, with a dilation rate of 1 equating to a standard convolution. Increasing the dilation rate increases the receptive field per layer and allows for integration of larger global context. The entirety of the series of dilated convolutional layers and activation functions can be trained end-to-end based on back-propagation of errors for the output layer backwards using gradient descent methods, as illustrated in FIG. 2($d$).

Figure 5:
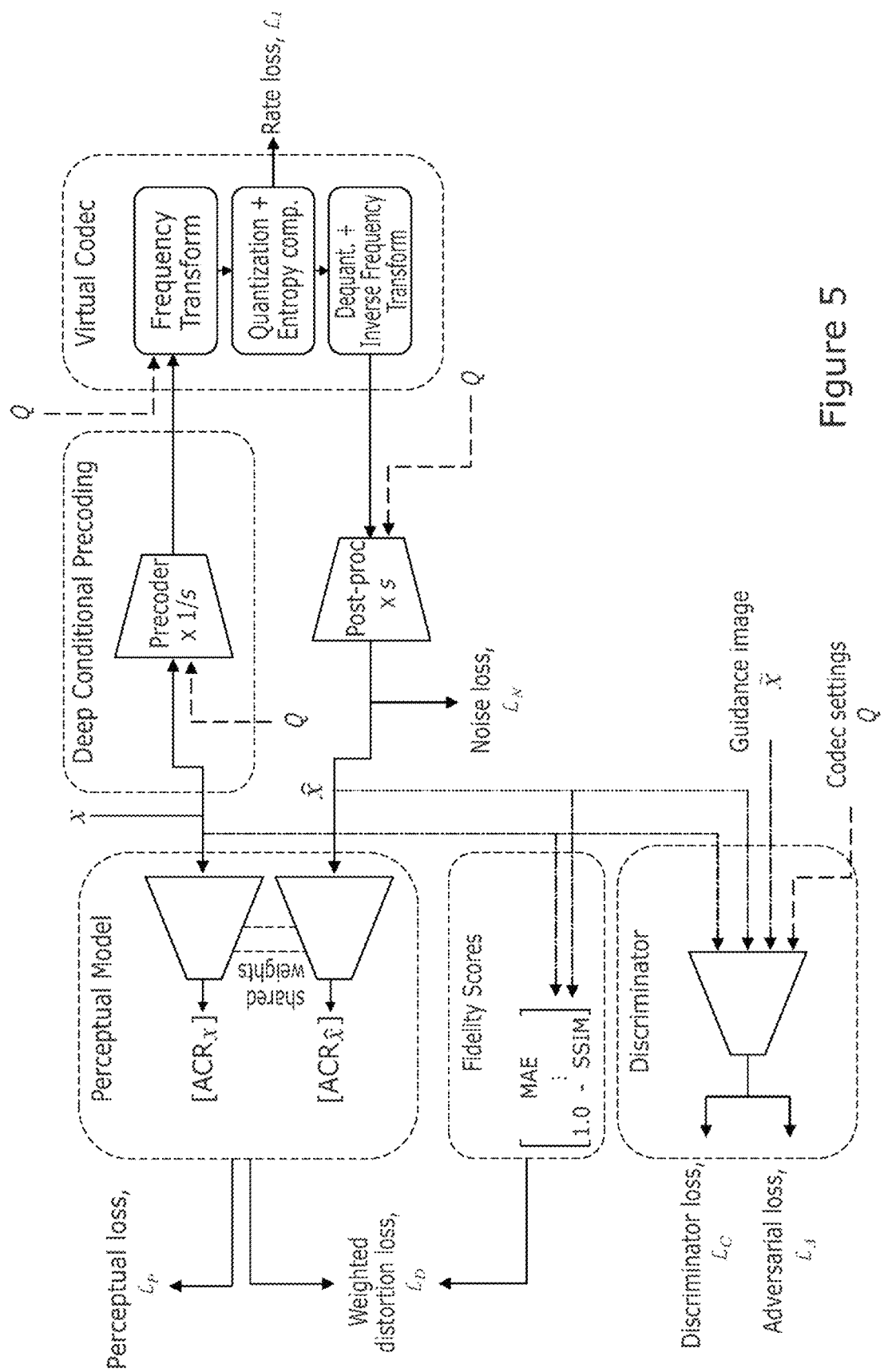
FIG. 5 is a schematic diagram showing a training process in accordance with embodiments.

An example of the framework for training the deep conditional precoding is shown in FIG. 5. In particular, FIG. 5 is a schematic diagram showing training of deep conditional precoding for intra-frame coding, where s represents the scale factor for resizing and Q represents the input codec settings. The discriminator and precoder are trained iteratively and the perceptual model can also be trained iteratively with the precoder, or pre-trained and frozen. The guidance image input $\tilde{x}$ to the discriminator refers to a linearly downscaled, compressed and upscaled representation of x. The post-processing refers to a simple linear (non-parametric) upscaling in this example. In this example, the precoding is trained in a manner that balances perceptual quality of the post-decoded output with fidelity to the original image or frame. The precoding is trained iteratively via backpropagation and any variation of gradient descent, e.g. as shown in FIG. 2($d$). Parameters of the learning process, such as the learning rate, the use of dropout and other regularization options to stabilize the training and convergence process are applied.

The presented training framework according to embodiments assumes that post-processing only constitutes a simple linear resizing. The framework comprises a linear or non-linear weighted combination of loss functions for training the deep conditional precoding. The loss functions used will now be described.

The distortion loss $\mathcal{L}_D$ is derived as a function of a perceptual model, and optimized over the precoder weights, in order to match or maximize the perceptual quality of the post-decoded output $\hat{x}$ over the original input x. The perceptual model is a parametric model that estimates the perceptual quality of the post-decoded output $\hat{x}$. The perceptual model can be configured as an artificial neural network with weights and activation functions and connectivity (e.g. as described above with reference to FIGS. 2($a$)-2($d$)). This perceptual model produces a reference or non-reference based score for quality; reference based scores compare the quality of $\hat{x}$ to x, whereas non-reference based scores produce a blind image quality assessment of $\hat{x}$. The perceptual model can optionally approximate non-differentiable perceptual score functions, including VIF, ADM2 and VMAF, with continuous differentiable functions. The perceptual model can also be trained to output human rater scores, including MOS or distributions over ACR values. The example shown in FIG. 5 represents a non-reference based instantiation trained to output the distribution over ACR values, however it will be understood that reference-based frameworks may be used in other examples. The perceptual model can either be pre-trained or trained iteratively with the deep conditional precoding by minimizing perceptual loss $\mathcal{L}_P$ and $\mathcal{L}_D$ alternately or sequentially respectively. The perceptual loss $\mathcal{L}_P$ is a function of the difference between the reference (human-rater) quality scores and model-predicted quality scores over a range of inputs. The distortion loss $\mathcal{L}_D$ can thus be defined between $\hat{x}$ and x, as a linear or non-linear function of the intermediate activations of selected layers of the perceptual model, up to the output reference or non-reference based scores. Additionally, in order to ensure faithful reconstruction of the input x, the distortion loss is combined with a pixel-wise loss directly between the input x and $\hat{x}$, such as mean absolute error (MAE) or mean squared error (MSE), and optionally a structural similarity loss, based on SSIM or MSSIM.

The adversarial loss $\mathcal{L}_A$ is optimized over the precoder weights, in order to ensure that the post-decoded output $\hat{x}$, which is generated via the precoder, lies on the natural image manifold. The adversarial loss is formulated by modelling the precoder as a generator and adding a discriminator into the framework, which in the example shown in FIG. 5 corresponds to the generative adversarial network (GAN) setup [2]. In the standard GAN configuration, the discriminator receives the original input frames, represented by x and the post-decoded output $\hat{x}$ as input, which can respectively be referred to as "real" and "fake" (or "artificial") data. The discriminator is trained to distinguish between the "real" and "fake" data with loss $\mathcal{L}_C$. On the contrary, the precoder is trained with $\mathcal{L}_A$ to fool the discriminator into classifying the "fake" data as "real". The discriminator and precoder are trained alternately with $\mathcal{L}_C$ and $\mathcal{L}_A$ respectively, with additional constraints such as gradient clipping depending on the GAN variant. The loss formulations for $\mathcal{L}_C$ and $\mathcal{L}_A$ directly depend on the GAN variant utilized; this can include but is not limited to standard saturating, non-saturating [2] [3] and least-squares GANs [4] and their relativistic GAN counterparts [5], and integral probability metric (IPM) based GANs, such as Wasserstein GAN (WGAN) [6] [7] and Fisher GAN [8]. Additionally, the loss functions can be patch-based (i.e. evaluated between local patches of x and $\hat{x}$) or can be image-based (i.e. evaluated between whole images). The discriminator is configured with conditional convolutional layers (e.g. as described above with reference to FIGS. 3 and 4). An additional guidance image or frame $\tilde{x}$ is passed to the discriminator, which can represent a linear downscaled, upscaled and compressed representation of x, following the same scaling and codec settings as $\hat{x}$. The discriminator can thus learn to distinguish between x, $\hat{x}$ and $\tilde{x}$, whilst the precoder can learn to generate representations that post-decoding and scaling will be perceptually closer to x than $\tilde{x}$.

It should be noted that, although the discriminator is depicted in the example of FIG. 5 as receiving the encoder settings Q, in alternative embodiments the encoder settings are not input to the discriminator. In any case, the discriminator may still be configured to distinguish between "real"

and "artificial" data, corresponding to the original image x and the post-decoded output image x̂.

The noise loss component $\mathcal{L}_N$ is optimized over the precoder weights and acts as a form of regularization, in order to further ensure that the precoder is trained such that the post-decoded output is a denoised representation of the input. Examples of noise include aliasing artefacts (e.g. jagging or ringing) introduced by downscaling in the precoder, as well as additional codec artefacts (e.g. blocking) introduced by the virtual codec during training to emulate a standard video or image codec that performs lossy compression. An example of the noise loss component $\mathcal{L}_N$ is total variation denoising, which is effective at removing noise while preserving edges.

The rate loss $\mathcal{L}_R$ is an optional loss component that is optimized over the precoder weights, in order to constrain the rate (number of bits or bitrate) of the precoder output, as estimated by a virtual codec module.

The virtual codec module depicted in FIG. 5 emulates a standard image or video codec that performs lossy compression and primarily consists of a frequency transform component, a quantization and entropy encoding component and a dequantization and inverse transform component. The codec module takes as input both the precoder output and any associated codec settings (e.g. CRF, preset) that the precoder itself is conditioned on (e.g. via the instantiated conditional convolutional layers depicted in FIG. 4). The frequency transform component of the virtual codec can be any variant of discrete sine or cosine transform or wavelet transform, or an atom-based decomposition. The dequantization and inverse transform component can convert the transform coefficients back into approximated pixel values. The main source of loss for the virtual codec module comes from the quantization component, which emulates any multi-stage deadzone or non-deadzone quantizer. Any non-differentiable parts of the standard codec are approximated with continuous differentiable alternatives, one such example is the rounding operation in quantization, which can be approximated with additive uniform noise of support width equal to 1. In this way, the entire virtual codec module is end-to-end continuously differentiable. To estimate the rate in $\mathcal{L}_R$, the entropy coding component represents a continuously differentiable approximation to a standard Huffman, arithmetic or runlength encoder, or any combination of those that is also made context adaptive, i.e. by looking at quantization symbol types and surrounding values (context conditioning) in order to utilize the appropriate probability model and compression method. The entropy coding and other virtual codec components can be made learnable, with an artificial neural network or similar, and jointly trained with the precoding or pre-trained to maximize the likelihood on the frequency transformed and quantized precoder representations. Alternatively, a given lossy JPEG, MPEG or AOMedia open encoder can be used to provide the actual rate and compressed representations as reference, which the virtual codec can be trained to replicate. In both cases, training of the artificial neural network parameters can be performed with backpropagation and gradient descent methods.

As shown in the example depicted in FIG. 5, the discriminator and deep conditional precoding may be trained alternately. This can also be true for the perceptual model and deep video precoding (or otherwise the perceptual model can be pre-trained and weights frozen throughout precoder training). After training one component, its weights are updated and it is frozen and the other component is trained. This weight update and interleaved training improves both and allows for end-to-end training and iterative improvement both during the training phase. The number of iterations that a component is trained before being frozen, n≥1. For the discriminator-precoding pair, this will depend on the GAN loss formulation and whether one seeks to train the discriminator to optimality. Furthermore, the training can continue online and at any time during the system's operation. An example of this is when new images and quality scores are added into the system, or new forms of transform and quantizer and entropy encoding modes are added, which correspond to a new or updated form of image or video encoding, or new types of image content, e.g., cartoon images, images from computer games, virtual or augmented reality applications, etc.

To test the methods described herein, a utilized video codec fully-compliant to the H.264/AVC standard was used, with the source code being the JM19.0 reference software of the HHI/Fraunhofer repository [21]. For experiments, the same encoding parameters were used, which were: encoding frame rate of 25 frames-per-second; YUV encoding with zero U, V channels since the given images are monochrome (zero-valued UV channels consume minimal bitrate that is equal for both the methods described herein and the original video encoder); one I frame (only first); motion estimation search range +/−32 pixels and simplified UMHexagon search selected; 2 reference frames; and P prediction modes enabled (and B prediction modes enabled for QP-based control); NumberBFrames parameter set to 0 for rate-control version and NumberBFrames set to 3 for QP control version; CABAC is enabled and single-pass encoding is used; single-slice encoding (no rate sacrificed for error resilience); in the rate-control version, InitialQP=32 and all default rate control parameters of the encoder.cfg file of JM19.0 were enabled; SourceBitDepthLuma/Chroma set to 12 bits and no use of rescaling or Q-Matrix.

Figure 6:
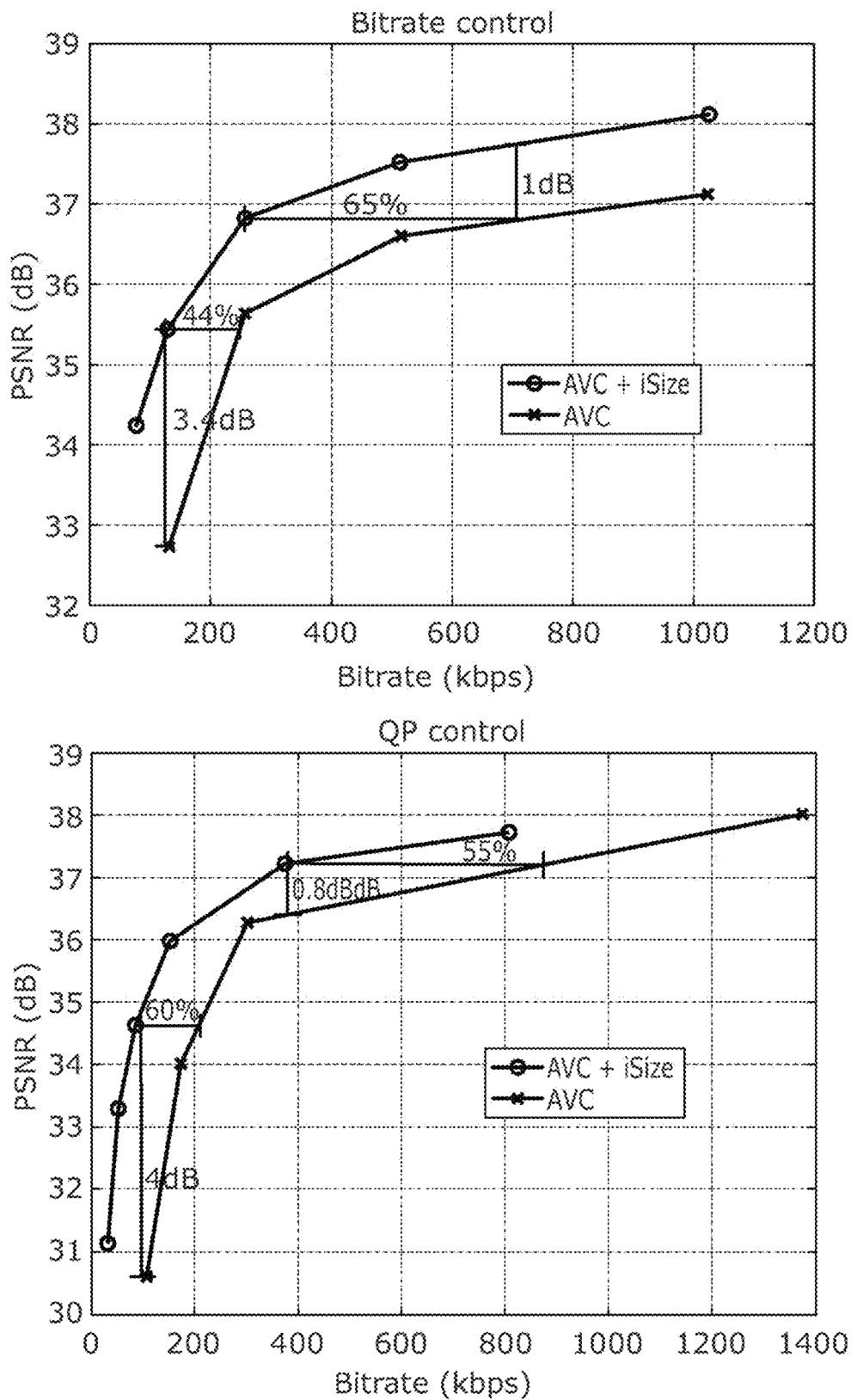
FIG. 6 is a graph of bitrate-vs-PSNR results in accordance with embodiments.

The source material comprised an infra-red sequence of images with 12-bit dynamic range, but similar results have been obtained with visual image sequences or videos in full HD or ultra-HD resolution and any dynamic range for the input pixel representations. For the bitrate-controlled test, the used bitrates were: {64, 128, 256, 512, 1024} kbps. For the QP-controlled test, the used QP values were within the range: {20,44}. These bitrates or QP parameters along with the encoding configuration settings for intra and inter prediction are included in a "config" file in the utilized AVC references software. All these settings were communicated to the disclosed preprocessing network system as shown in FIG. 1. A conditional neural network architecture based on the embodiments depicted in FIGS. 2(a)-2(d) and FIG. 3 was used to implement the conditional precoding system. The training and testing followed the embodiments described in FIG. 4 and FIG. 5. The results are shown in FIG. 6. FIG. 6 shows the bitrate-vs-PSNR results for a sequence of infra-red images, with AVC encoding under rate (left) and QP control (right). The average BD-rate gain is 62% (see [22] for a definition of BD-rate). For these encoding tests, 25 fps has been assumed. If the content is captured and encoded at lower fps (e.g., 10 fps), then the bitrates of all solutions should be divided appropriately (e.g., by 2.5). As shown by FIG. 6, for the provided video sequence and under the knowledge of the encoding parameters, the methods described herein offers 50%-65% reduction in bitrate, or 0.8 dB-3.4 dB improvement in PSNR. This occurs for both types of encodings (bitrate and QP control). Beyond the presented embodiments, the methods described herein can be realized with the full range of options and adaptivity described in the previous examples, and all such options and their adaptations are covered by this disclosure.

Using as an option selective downscaling during the precoding process and allowing for a linear upscaling component at the client side after decoding (as presented in FIG. 1), the methods described herein can shrink the input to 10%-40% of the frame size of the input frames, which means that the encoder processes a substantially smaller number of pixels and is therefore 2-6 times faster than the encoder of the full resolution infrared image sequence. This offers additional benefits in terms of increased energy autonomy for video monitoring under battery support, vehicle/mobile/airborne visual monitoring systems, etc.

Figure 7:
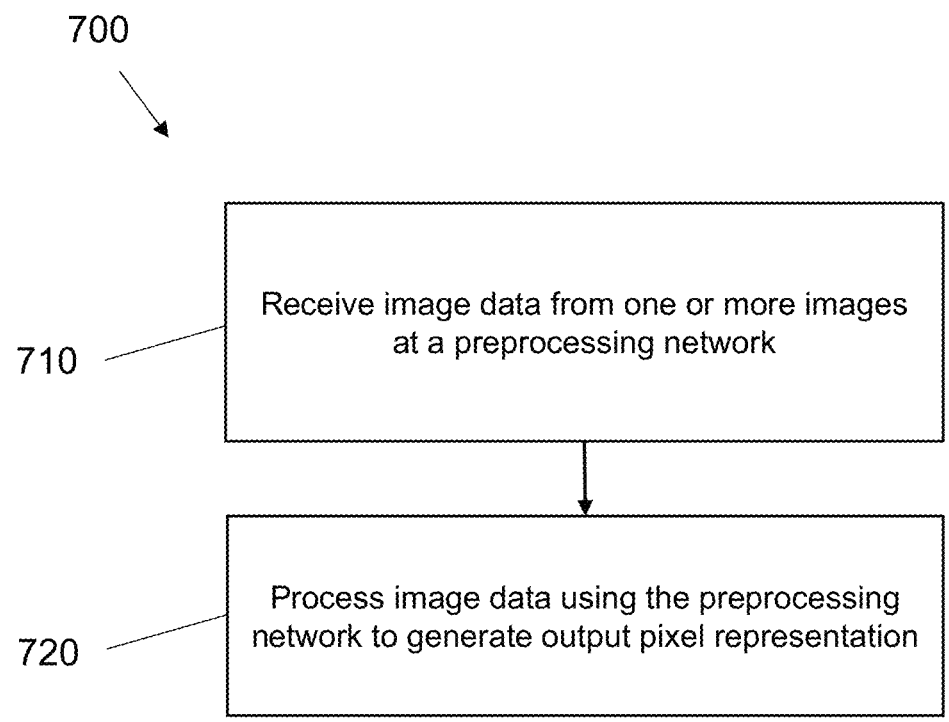
FIG. 7 is a flowchart showing the steps of a method of preprocessing image data in accordance with embodiments.

FIG. 7 shows a method 700 for preprocessing image data using a preprocessing network comprising a set of inter-connected learnable weights. The method 700 may be performed by a computing device, according to embodiments. The method 700 may be performed at least in part by hardware and/or software. The preprocessing is performed prior to encoding the preprocessed image data with an external encoder. The preprocessing network is configured to take as an input encoder configuration data representing one or more configuration settings of the external encoder. The weights of the preprocessing network are dependent upon (i.e. conditioned on) the one or more configuration settings of the external encoder. At item 710, image data from one or more images is received at the preprocessing network. The image data may be retrieved from storage (e.g. in a memory), or may be received from another entity. At item 720, the image data is processed using the preprocessing network (e.g. by applying the weights of the preprocessing network to the image data) to generate an output pixel representation for encoding with the external encoder. In embodiments, the method 700 comprises encoding the output pixel representation, e.g. using the external encoder. The encoded output pixel representation may be transmitted, for example to a display device for decoding and subsequent display.

Figure 8:
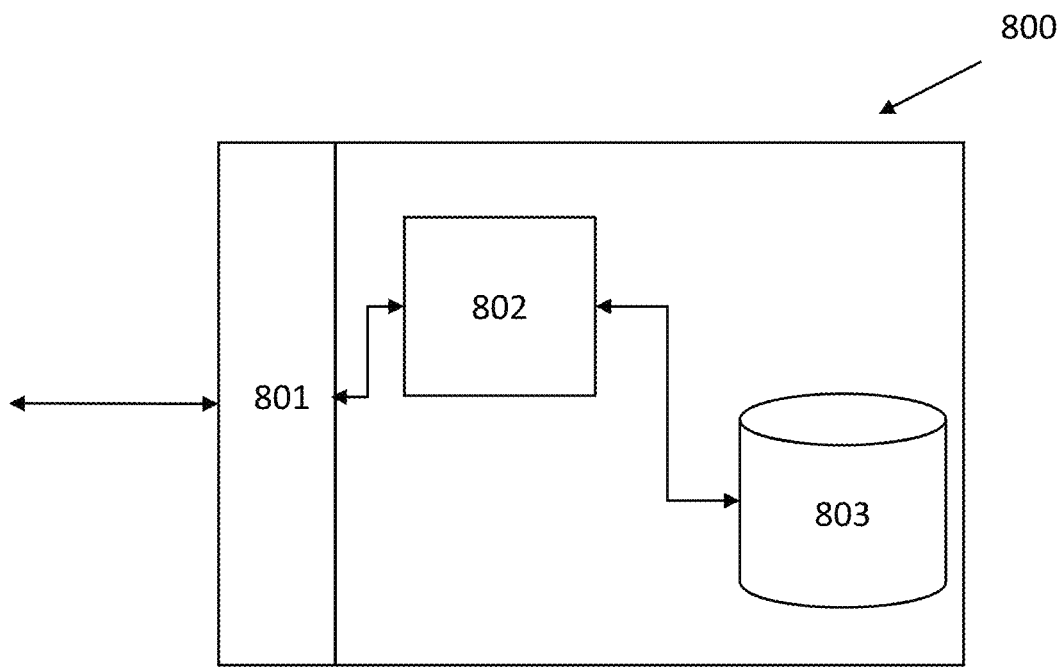
FIG. 8 is a schematic diagram of a computing device in accordance with embodiments.

Embodiments of the disclosure include the methods described above performed on a computing device, such as the computing device 800 shown in FIG. 8. The computing device 800 comprises a data interface 801, through which data can be sent or received, for example over a network. The computing device 800 further comprises a processor 802 in communication with the data interface 801, and memory 803 in communication with the processor 802. In this way, the computing device 800 can receive data, such as image data or video data, via the data interface 801, and the processor 802 can store the received data in the memory 803, and process it so as to perform the methods of described herein, including preprocessing image data prior to encoding using an external encoder, and optionally encoding the preprocessed image data.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Various measures (including methods, apparatus, computing devices and computer program products) are provided for preprocessing of a single or a plurality of images prior to encoding them with an external image or video encoder. The preprocessing method comprises a set of weights, biases and offset terms inter-connected in a network (termed as "preprocessing network") that ingests: (i) the input pixels from the single or plurality of images; (ii) the encoder configuration settings corresponding to bitrate, quantization or target fidelity of the encoding. The utilized preprocessing network is configured to convert input pixels to an output pixel representation such that: weights and offset or bias terms of the network are conditioned on the aforementioned bitrate, quantization or fidelity settings and the weights are trained end-to-end with back-propagation of errors from outputs to inputs. The output errors are computed via a cost function that estimates the image or video frame error after encoding and decoding the output pixel representation of the preprocessing network with the aforementioned external encoder using bitrate, quantization or fidelity settings close to, or identical, to the ones used as inputs to the network. The utilized cost function comprises multiple terms that, for the output after decoding, express: image or video frame noise estimates, or functions or training data that estimate the rate to encode the image or video frame, or estimates, functions or training data expressing the perceived quality of the output from human viewers, or any combinations of these terms. The preprocessing network is trained from scratch with the utilized cost function after a random initialization, or refined from a previous training, for any number of iterations prior to deployment (offline) based on training data or, optionally, have their training fine-tuned for any number of iterations based on data obtained during the preprocessing network and encoder-decoder operation during deployment (online).

In embodiments, the resolution of the pixel data is increased or decreased in accordance to a given upscaling or downscaling ratio that can be an integer or fractional number and also includes ratio of 1 (unity) that corresponds to no resolution change.

In embodiments, weights in the preprocessing network are used, in order to construct a function of the input over single or multiple layers of a convolutional architecture, with each layer receiving outputs of the previous layers.

In embodiments, the outputs of each layer of the preprocessing network are passed through a non-linear parametric linear rectifier function (pReLU) or other non-linear activation function.

In embodiments, the convolutional layers of the preprocessing architecture include dilation operators that expand the receptive field of the convolutional operation per layer.

In embodiments, the training of the preprocessing network weights is done with the addition of regularization methods that control the network capacity, via hard or soft constraints or normalization techniques on the layer weights or activations that reduces the generalization error.

In embodiments, cost functions are used that express the fidelity to the input images based on reference-based quality metrics that include one or more of: elementwise loss functions such as mean squared error (MSE); a structural similarity index metric (SSIM); a visual information fidelity metric (VIF), for example from the published work of H. Sheikh and A. Bovik entitled "Image Information and Visual Quality"; a detail loss metric (DLM), for example from the published work of S. Li, F. Zhang, L. Ma, and K. Ngan entitled "Image Quality Assessment by Separately Evaluating Detail Losses and Additive Impairments"; or variants and combinations of these metrics.

In embodiments, cost functions are used that express or estimate quality scores attributed to the output images from human viewers.

In embodiments, cost functions are used that are formulated via an adversarial learning framework, in which the preprocessing network is encouraged to generate output pixel representations that reside on the natural image manifold (and optionally encouraged to reside away from another non-representative manifold).

In embodiments, the provided image or video encoder parameters include quantization or fidelity values per input image, or constant rate factor (CRF) values from a video encoder, or bit allocation budgets per input image, or any combination of these.

In embodiments, the utilized encoder is a standards-based image or video encoder such as an ISO JPEG or ISO MPEG standard encoder, or a proprietary or royalty-free encoder, such as, but not limited to, an AOMedia encoder.

In embodiments, high resolution and low resolution image or video pairs are provided and the low resolution image is upscaled and optimized to improve and/or match quality or rate to the high resolution image.

In embodiments, the training of the preprocessing network weights and any adjustment to the cost functions are performed at frequent or in-frequent intervals with new measurements from quality, bitrate, perceptual quality scores from humans, or encoded image data from external image or video encoders, and the updated weights and cost functions replace the previously-utilized ones.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

REFERENCES

[1] F. Yu and V. Koltun, "Multi-scale context aggregation by dilated convolutions," arXiv preprint arXiv:1511.07122, 2015.
[2] I. Goodfellow, J. Pouget-Abadie, M. Mirza, B. Xu, D. Warde-Farley, S. Ozair, A. Courville and Y. Bengio, "Generative adversarial nets," in Advances in neural information processing systems, 2014.
[3] T. Salimans, I. Goodfellow, W. Zaremba, V. Cheung, A. Radford and X. Chen, "Improved techniques for training gans," in Advances in neural information processing systems, 2016.
[4] X. Mao, Q. Li, H. Xie, R. Y. K. Lau, Z. Wang and S. Paul Smolley, "Least squares generative adversarial networks," in Proceedings of the IEEE International Conference on Computer Vision, 2017.
[5] A. Jolicoeur-Martineau, "The relativistic discriminator: a key element missing from standard GAN," arXiv preprint arXiv:1807.00734, 2018.
[6] M. Arjovsky, S. Chintala and L. Bottou, "Wasserstein gan," arXiv preprint arXiv:1701.07875, 2017.
[7] I. Gulrajani, F. Ahmed, M. Arjovsky, V. Dumoulin and A. C. Courville, "Improved training of wasserstein gans," in Advances in neural information processing systems, 2017.
[8] Y. Mroueh and T. Sercu, "Fisher gan," in Advances in Neural Information Processing Systems, 2017.
[9] Boyce, Jill, et al. "Techniques for layered video encoding and decoding." U.S. patent application Ser. No. 13/738, 138.
[10] Dar, Yehuda, and Alfred M. Bruckstein. "Improving low bit-rate video coding using spatio-temporal downscaling." arXiv preprint arXiv:1404.4026 (2014).
[11] Martemyanov, Alexey, et al. "Real-time video coding/decoding." U.S. Pat. No. 7,336,720. 26 Feb. 2008.
[12] van der Schaar, Mihaela, and Mahesh Balakrishnan. "Spatial scalability for fine granular video encoding." U.S. Pat. No. 6,836,512. 28 Dec. 2004.
[13] Dong, Jie, and Yan Ye. "Adaptive downsampling for high-definition video coding." IEEE Transactions on Circuits and Systems for Video Technology 24.3 (2014): 480-488.
[14] Douma, Peter, and Motoyuki Koike. "Method and apparatus for video upscaling." U.S. Pat. No. 8,165,197. 24 Apr. 2012.
[15] Su, Guan-Ming, et al. "Guided image up-sampling in video coding." U.S. Pat. No. 9,100,660. 4 Aug. 2015.
[16] Hinton, Geoffrey E., and Ruslan R. Salakhutdinov. "Reducing the dimensionality of data with neural networks." science313.5786 (2006): 504-507.
[17] van den Oord, Aaron, et al. "Conditional image generation with pixelcnn decoders." Advances in Neural Information Processing Systems. 2016.
[18] Theis, Lucas, et al. "Lossy image compression with compressive autoencoders." arXiv preprint arXiv: 1703.00395 (2017).
[19] Wu, Chao-Yuan, Nayan Singhal, and Philipp Krahenbithl. "Video Compression through Image Interpolation." arXiv preprint arXiv:1804.06919 (2018).
[20] Rippel, Oren, and Lubomir Bourdev. "Real-time adaptive image compression." arXiv preprint arXiv: 1705.05823 (2017).
[21] K. Suehring, HHI AVC reference code repository, online at the HHI website.
[22] G. Bjontegaard, "Calculation of average PSNR differences between RD-curves," VCEG-M33 (2001)

What is claimed is:

1. A computer-implemented method of preprocessing, prior to encoding with an external encoder, image data using a preprocessing network comprising inter-connected learnable weights, the method comprising:
receiving, at the preprocessing network, image data from one or more images; and processing the image data using the preprocessing network to generate an output pixel representation for encoding with the external encoder, wherein
the preprocessing network is configured to take as an input encoder configuration data representing one or more configuration settings of the external encoder,
the inter-connected learnable weights of the preprocessing network are dependent upon the one or more configuration settings of the external encoder, and
the inter-connected learnable weights of the processing network are trained using end-to-end back-propagation of errors, wherein the errors are calculated based on:
one or more quality metrics, generated by using a cost function, indicative of estimated image error associated with output pixel representations generated by the preprocessing network according to the one or more configuration settings represented by the input encoder configuration data, and
one or more differentiable functions that emulate the external encoder.

2. The method of claim 1, wherein the one or more configuration settings comprise at least one of a bitrate, a quantization, or a target fidelity of encoding performed by the external encoder.

3. The method of claim 1, wherein the one or more quality metrics are further indicative of an estimate of at least one of:
an image noise of an output of decoding the output pixel representation;
a bitrate to encode the output pixel representation; or
a perceived quality of the output of decoding the output pixel representation.

4. The method of claim 1, wherein the estimated image error is indicative of a similarity of an output of decoding the output pixel representation and the received image data based on at least one of the one or more quality metrics, wherein the at least one of the one or more quality metrics comprises at least one of:
an elementwise loss function;
a structural similarity index metric (SSIM); or
a visual information fidelity metric (VIF).

5. The method of claim 1, wherein the cost function is formulated using an adversarial learning framework, in which the preprocessing network is trained to generate output pixel representations that reside on a natural image manifold.

6. The method of claim 1, comprising training the inter-connected learnable weights of the preprocessing network using training image data, prior to deployment of the preprocessing network, based on a random initialization or a prior training phase.

7. The method of claim 1, comprising training the inter-connected learnable weights of the preprocessing network using image data obtained during deployment of the preprocessing network.

8. The method of claim 1, wherein a resolution of the received image data is different from the resolution of the output pixel representation.

9. The method of claim 1, wherein the preprocessing network comprises an artificial neural network including multiple layers having a convolutional architecture, with each layer being configured to receive output of one or more previous layers.

10. The method of claim 9, comprising passing outputs of each layer of the preprocessing network through a non-linear parametric linear rectifier function, pReLU.

11. The method of claim 1, wherein the preprocessing network comprises a dilation operator configured to expand a receptive field of a convolutional operation of a given layer of the preprocessing network.

12. The method of claim 1, wherein the inter-connected learnable weights of the preprocessing network are trained using a regularization method that controls a capacity of the preprocessing network, the regularization method comprising using hard or soft constraints and/or a normalization technique on the inter-connected learnable weights that reduces a generalization error.

13. A computing device comprising:
a memory comprising computer-executable instructions;
a processor configured to execute the computer-executable instructions and cause the computing device to preprocess, prior to encoding with an external encoder, image data using a preprocessing network comprising inter-connected learnable weights by:
receiving, at the preprocessing network, image data from one or more images; and
processing the image data using the preprocessing network to generate an output pixel representation for encoding with the external encoder, wherein:
the preprocessing network is configured to take as an input encoder configuration data representing one or more configuration settings of the external encoder,
the inter-connected learnable weights of the preprocessing network are dependent upon the one or more configuration settings of the external encoder, and
the inter-connected learnable weights of the processing network are trained using end-to-end back-propagation of errors, wherein the errors are calculated based on:
one or more quality metrics, generated by using a cost function, indicative of estimated image error associated with output pixel representations generated by the preprocessing network according to the one or more configuration settings represented by the input encoder configuration data, and
one or more differentiable functions that emulate the external encoder.

14. A non-transitory computer-readable medium comprising computer-executable instructions that, when executed by a processor of a computing device, cause the computing device to perform a method of preprocessing, prior to encoding with an external encoder, image data using a preprocessing network comprising inter-connected learnable weights, the method comprising:
receiving, at the preprocessing network, image data from one or more images; and
processing the image data using the preprocessing network to generate an output pixel representation for encoding with the external encoder, wherein:
the preprocessing network is configured to take as an input encoder configuration data representing one or more configuration settings of the external encoder,
the inter-connected learnable weights of the preprocessing network are dependent upon the one or more configuration settings of the external encoder, and
the inter-connected learnable weights of the processing network are trained using end-to-end back-propagation of errors, wherein the errors are calculated based on:

one or more quality metrics, generated by using a cost function, indicative of estimated image error associated with output pixel representations generated by the preprocessing network according to the one or more configuration settings represented by the input encoder configuration data, and one or more differentiable functions that emulate the external encoder.

15. The non-transitory computer-readable medium of claim 14, wherein the one or more configuration settings comprise at least one of a bitrate, a quantization, or a target fidelity of encoding performed by the external encoder.

16. The non-transitory computer-readable medium of claim 14, wherein the one or more quality metrics are further indicative of an estimate of at least one of:

an image noise of an output of decoding the output pixel representation;

a bitrate to encode the output pixel representation; or a perceived quality of the output of decoding the output pixel representation.

17. The non-transitory computer-readable medium of claim 14, wherein the estimated image error is indicative of a similarity of an output of decoding the output pixel representation and the received image data based on at least one of the one or more quality metrics, wherein the at least one of the one or more quality metrics comprises at least one of:

an elementwise loss function;

a structural similarity index metric (SSIM); or a visual information fidelity metric (VIF).

18. The non-transitory computer-readable medium of claim 14, wherein the cost function is formulated using an adversarial learning framework, in which the preprocessing network is trained to generate output pixel representations that reside on a natural image manifold.

19. The non-transitory computer-readable medium of claim 14, the method further comprising training the interconnected learnable weights of the preprocessing network using training image data, prior to deployment of the preprocessing network, based on a random initialization or a prior training phase.

20. The non-transitory computer-readable medium of claim 14, the method further comprising training the interconnected learnable weights of the preprocessing network using image data obtained during deployment of the preprocessing network.

* * * * *